United States Patent
Yang

(10) Patent No.: US 10,511,682 B2
(45) Date of Patent: Dec. 17, 2019

(54) GROUP RESOURCE UPDATING PROCESSING METHODS, DEVICES AND SYSTEM, AND CSES

(71) Applicant: ZTE Corporation, Shenzhen (CN)

(72) Inventor: Kun Yang, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 208 days.

(21) Appl. No.: 15/526,820

(22) PCT Filed: May 11, 2015

(86) PCT No.: PCT/CN2015/078706
§ 371 (c)(1),
(2) Date: May 15, 2017

(87) PCT Pub. No.: WO2016/074455
PCT Pub. Date: May 19, 2016

(65) Prior Publication Data
US 2018/0288184 A1 Oct. 4, 2018

(30) Foreign Application Priority Data

Nov. 14, 2014 (CN) .......................... 2014 1 0650224
Nov. 18, 2014 (CN) .......................... 2014 1 0660392

(51) Int. Cl.
*G06F 15/173* (2006.01)
*H04L 29/08* (2006.01)
(Continued)

(52) U.S. Cl.
CPC ...... *H04L 67/2833* (2013.01); *H04L 47/2408* (2013.01); *H04L 47/803* (2013.01);
(Continued)

(58) Field of Classification Search
CPC ....... H04W 4/70; H04W 4/08; H04W 72/121; H04L 67/12; H04L 41/082
(Continued)

(56) References Cited

U.S. PATENT DOCUMENTS

2012/0284406 A1* 11/2012 Wang ............... H04W 4/70
709/225
2013/0029716 A1* 1/2013 Lee .................. H04W 4/70
455/519

(Continued)

FOREIGN PATENT DOCUMENTS

CN 101616399 A 12/2009
CN 103096433 A 5/2013
(Continued)

OTHER PUBLICATIONS

International Search Report for corresponding application PCT/CN2015/078706 filed on May 11, 2015; dated Aug. 13, 2015.
(Continued)

*Primary Examiner* — Duyen M Doan
(74) *Attorney, Agent, or Firm* — Cantor Colburn LLP

(57) ABSTRACT

Group resource updating processing methods, devices and system and Common Services Entities (CSEs) are provided. In the group resource updating processing method, a group resource of a preset group is created, and group members corresponding to the group resource include a member representative configured to represent the group members; a group resource updating request for performing an updating operation on the group members corresponding to the group resource is received from a remote CSE; and an updating operation result of the member representative is fed back, according to the group resource updating request, to the remote CSE as updating operation results of all the group members corresponding to the group resource.

12 Claims, 4 Drawing Sheets

(51) Int. Cl.
*H04W 4/08* (2009.01)
*H04W 4/70* (2018.01)
*H04L 12/851* (2013.01)
*H04L 12/927* (2013.01)

(52) U.S. Cl.
CPC ............... *H04L 67/12* (2013.01); *H04W 4/08* (2013.01); *H04W 4/70* (2018.02)

(58) Field of Classification Search
USPC .................................................. 709/203, 226
See application file for complete search history.

(56) References Cited

U.S. PATENT DOCUMENTS

| | | | |
|---|---|---|---|
| 2013/0346504 A1* | 12/2013 | Huang | H04L 12/185 709/204 |
| 2014/0071887 A1* | 3/2014 | Tian | H04L 5/0094 370/328 |
| 2015/0009818 A1* | 1/2015 | Xiao | H04W 4/12 370/230.1 |
| 2017/0013424 A1* | 1/2017 | Saeki | H04W 4/08 |
| 2017/0318521 A1* | 11/2017 | Wu | H04W 48/08 |

FOREIGN PATENT DOCUMENTS

| | | |
|---|---|---|
| CN | 103188616 A | 7/2013 |
| CN | 103618800 A | 3/2014 |
| WO | 2014169804 A1 | 10/2014 |

OTHER PUBLICATIONS

European Search Report for corresponding application EP15859105; dated Aug. 9, 2017.

* cited by examiner

GROUP RESOURCE UPDATING PROCESSING METHODS, DEVICES AND SYSTEM, AND CSES

TECHNICAL FIELD

The present disclosure relates to the field of communication, and more particularly to group resource updating processing methods, devices and system, and Common Services Entities (CSEs).

BACKGROUND

A Machine-to-Machine/Man (M2M) communication system consists of M2M nodes and an underlying network. The M2M nodes communicate with one another through the underlying network. Each M2M node at least includes an Application Entity (AE) or a CSE. The AE is a logical unit that executes a practical M2M application. The CSE is a logical unit that manages and serves the application. An underlying Network Services Entity (NSE), which may be embodied as, for example, a Home Subscriber Server (HSS) or an MTC-Inter Working Function (MTC-IWF) entity, provides services of equipment management, location-based service, equipment triggering and the like for the CSE.

Communication between M2M applications is implemented by interaction between CSEs. The M2M applications are required to be registered in the CSEs, the CSEs are also required to be mutually registered, and then interaction between the M2M applications may further be implemented by communication between the CSEs. FIG. 1 is a schematic diagram of M2M system architecture according to a related technology. As shown in FIG. 1, in the M2M system architecture, an application node is an end execution node, which may be, for example, an intelligent electric meter, a temperature measurement and control sensor, a fire alarm and an intelligent home appliance. A Middle Node (MN), which may be embodied as, for example, a gateway, is middleware that connects the end execution node to a network-side server. An Infrastructure Node (IN) is a network-side server, and an application registered to the IN (i.e., an IN-AE) may be, for example, a management platform of an M2M Service Provider (M2M SP).

Application nodes may be divided into two categories according to different functions. An application node of a first category includes a CSE while an application node of a second category includes no CSE. An Application Dedicated Node (ADN) at least includes an AE, and does not include any CSE. An Application Service Node (ASN) at least includes an AE and a CSE.

A group management common service function in a CSE enables an M2M system to execute a batch operation on multiple pieces of equipment, applications or resources in a group. In addition, the group management common service function supports a batch operation over multiple concerned resources, and aggregates execution results. A group resource represents a group of resources of the same type or multiple types, and is arranged to execute a batch operation on resources indicated by a "member list" attribute. The group resource includes an attribute representative of members in the group, i.e. the "member list" attribute, and a virtual resource "distribution point" capable of applying the operation to the resources represented by the members. When a request is sent to the virtual resource, the request is distributed to the members, indicated by the "member list" attribute, of the group resource. Responses of each member to the request are aggregated and fed back to an initiator of the request.

During a practical application, the number of equipment, applications or resources in an M2M group may be very large, so that distribution of a request message and aggregation of response messages both require relatively high signaling overhead, thereby occupying network resources and even causing network congestion.

Therefore, there exists the problem of network congestion caused by relatively higher signaling overhead required by a batch operation over members in a group in the related technology.

SUMMARY

Some embodiments of the present disclosure provide group resource updating processing methods, devices and system, and CSEs, so as to at least solve the problem of network congestion caused by relatively higher signaling overhead required by a batch operation over members in a group in the related technology.

According to an embodiment of the present disclosure, a group resource updating processing method is provided, which may include the following acts. A group resource of a preset group is created, and group members corresponding to the group resource may include a member representative configured to represent the group members. A group resource updating request for performing an updating operation on the group members corresponding to the group resource is received from a remote CSE. An updating operation result of the member representative is fed back, according to the group resource updating request, to the remote CSE as updating operation results of all the group members corresponding to the group resource.

In an exemplary embodiment, before the updating operation result of the member representative is fed back, according to the group resource updating request, to the remote CSE as the updating operation results of all the group members corresponding to the group resource, the method may further include the following acts. The group resource updating request is sent to the member representative. The updating operation result, obtained according to the group resource updating request, of the member representative is received.

In an exemplary embodiment, before the updating operation result of the member representative is fed back, according to the group resource updating request, to the remote CSE as the updating operation results of all the group members corresponding to the group resource, the method may further include the following acts. A result content attribute in the group resource updating request is updated to be null. The group resource updating request in which the result content attribute is updated to be null is distributed to ordinary members except the member representative in the group members corresponding to the group resource. Updating operation response messages of the ordinary members are aggregated, in which the updating operation response messages may only contain identification codes indicating whether the updating operation succeeds or not.

In an exemplary embodiment, the member representative in the group members corresponding to the group resource may be identified in at least one of the following manners: an AE Identifier (AE-ID) of an AE, a CSE-ID of a CSE, a Uniform Resource Identifier (URI) of an AE, or a URI of a CSE.

According to another embodiment of the present disclosure, a group resource updating processing method is provided, which may include the following acts. A group resource updating request for updating a group resource corresponding to group members of a preset group is sent, and the group members may include a member representative configured to represent the group members. A response message in which an updating operation result of the member representative serves as updating operation results of all the group members corresponding to the group resource is received.

In an exemplary embodiment, the member representative in the group members corresponding to the group resource may be identified in at least one of the following manners: an AE-ID of an AE, a CSE-ID of a CSE, a URI of an AE, or a URI of a CSE.

According to another embodiment of the present disclosure, a group resource updating processing device is provided, which may include a creation module, a first receiving module and a feedback module. The creation module is arranged to create a group resource of a preset group, where group members corresponding to the group resource may include a member representative configured to represent the group members. The first receiving module is arranged to receive, from a remote CSE, a group resource updating request for performing an updating operation on the group members corresponding to the group resource. The feedback module is arranged to feed back, according to the group resource updating request, to the remote CSE an updating operation result of the member representative as updating operation results of all the group members corresponding to the group resource.

In an exemplary embodiment, the device may further include a first sending module and a second receiving module. The first sending module is arranged to send the group resource updating request to the member representative. The second receiving module is arranged to receive the updating operation result, obtained according to the group resource updating request, of the member representative.

In an exemplary embodiment, the device may further include an updating module, a distribution module and an aggregation module. The updating module is arranged to update a result content attribute in the group resource updating request to be null. The distribution module is arranged to distribute the group resource updating request in which the result content attribute is updated to be null to ordinary members except the member representative in the group members corresponding to the group resource. The aggregation module is arranged to aggregate updating operation response messages of the ordinary members, and the updating operation response messages may only contain identification codes indicating whether the updating operation succeeds or not.

In an exemplary embodiment, the member representative in the group members corresponding to the group resource may be identified in at least one of the following manners: an AE-ID of an AE, a CSE-ID of a CSE, a URI of an AE, or a URI of a CSE.

According to another embodiment of the present disclosure, a local CSE is provided, which may include the device in any abovementioned exemplary embodiment.

According to another embodiment of the present disclosure, a group resource updating processing device is provided, which may include a second sending module and a third receiving module. The second sending module is arranged to send a group resource updating request for updating a group resource corresponding to group members of a preset group, where the group members may include a member representative configured to represent the group members. The third receiving module is arranged to receive a response message in which an updating operation result of the member representative serves as updating operation results of all the group members corresponding to the group resource.

In an exemplary embodiment, the member representative in the group members corresponding to the group resource may be identified in at least one of the following manners: an AE-ID of an AE, a CSE-ID of a CSE, a URI of an AE, or a URI of a CSE.

According to another embodiment of the present disclosure, a remote CSE is provided, which may include the device in any abovementioned exemplary embodiment.

According to another embodiment of the present disclosure, a group resource updating processing system is provided, which may include at least one of any abovementioned local CSE or any abovementioned remote CSE.

According to the embodiments of the present disclosure, the group resource of the preset group is created, and the group members corresponding to the group resource include the member representative configured to represent the group members; the group resource updating request which requests conduction of the updating operation on the group members corresponding to the group resource is received from the remote CSE; and the updating operation result of the member representative is fed back, according to the group resource updating request, to the remote CSE as the updating operation results of all the group members corresponding to the group resource. The problem of network congestion caused by relatively higher signaling overhead required by a batch operation over members in a group in the related technology is solved, and effects of optimizing a group member attribute operation, effectively reducing the signaling overhead and avoiding the network congestion are further achieved.

BRIEF DESCRIPTION OF THE DRAWINGS

The drawings described here are adopted to provide a further understanding to the present disclosure, and form a part of the present disclosure. Schematic embodiments of the present disclosure and descriptions thereof are adopted to explain the present disclosure and not intended to form limits to the present disclosure. In the drawings.

DETAILED DESCRIPTION OF THE EMBODIMENTS

The present disclosure will be described below in detail with reference to the drawings and embodiments. It may be appreciated that the embodiments in the present disclosure and characteristics in the embodiments may be combined under the condition of no conflicts.

Figure 1:
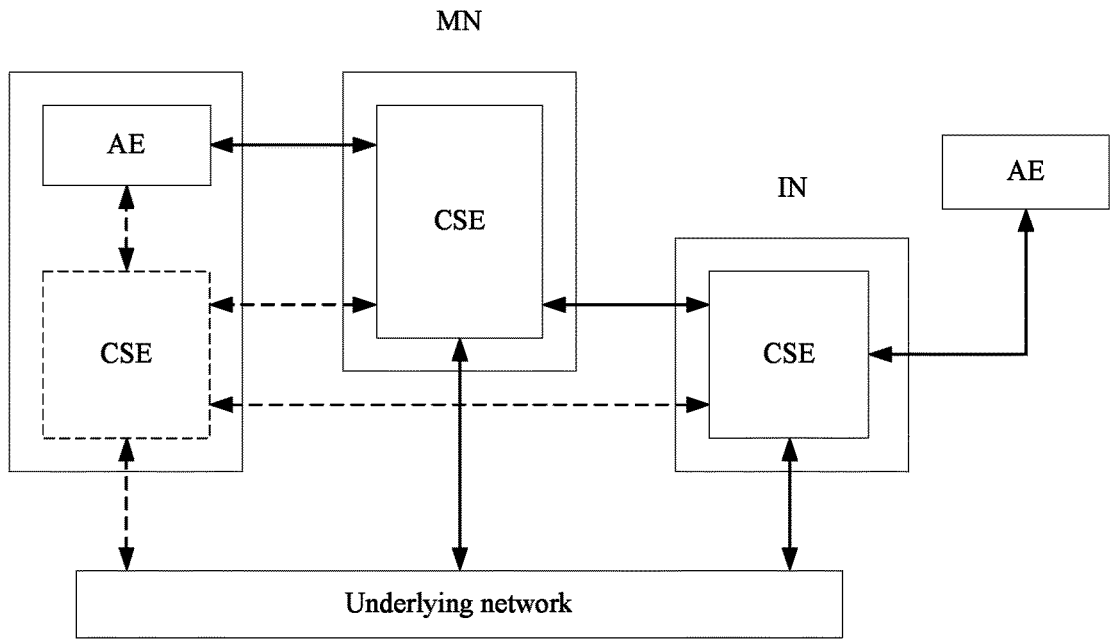
FIG. 1 is a schematic diagram of M2M system architecture according to the related technology.
Figure 2:
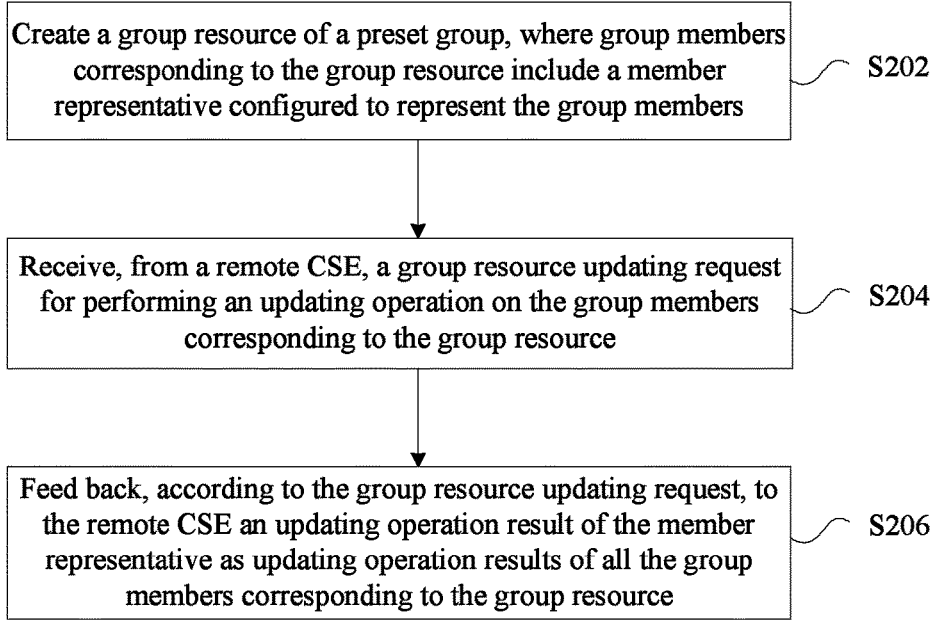
FIG. 2 is a flowchart of a first group resource updating processing method according to an embodiment of the present disclosure.

An embodiment provides a group resource updating processing method. FIG. 2 is a flowchart of a first group resource updating processing method according to an embodiment of the present disclosure. As shown in FIG. 2, the flow includes the following acts S202 to S206.

At act S202, a group resource of a preset group is created. Group members corresponding to the group resource include a member representative configured to represent the group members.

At act S204, a group resource updating request for performing an updating operation on the group members corresponding to the group resource is received from a remote CSE.

At act S206: an updating operation result of the member representative is fed back, according to the group resource updating request, to the remote CSE as updating operation results of all the group members corresponding to the group resource.

By the acts, the updating operation result of the member representative is fed back to the remote CSE as the updating operation results of all the group members corresponding to the group resource. In the related technology, operation results of all the group members need to be aggregated during the updating operation over all the group members, causing the problems of high overhead and network congestion. In the present embodiment, the updating operation result of the member representative is fed back as the updating operation results of all the members, which solves the problem of network congestion caused by relatively higher signaling overhead required by a batch operation over members in a group in the related technology and further achieves effects of optimizing a group member attribute operation, effectively reducing the signaling overhead and avoiding the network congestion.

In the embodiments, before the updating operation result of the member representative is fed back, according to the group resource updating request, to the remote CSE as the updating operation results of all the group members corresponding to the group resource, processing over the member representative may include the following acts. The group resource updating request is sent to the member representative. The updating operation result, obtained according to the group resource updating request, of the member representative is received.

On the other aspect, before the updating operation result of the member representative is fed back, according to the group resource updating request, to the remote CSE as the updating operation results of all the group members corresponding to the group resource, processing over ordinary members except the member representative may include the following acts. A result content attribute in the group resource updating request is updated to be null. The group resource updating request in which the result content attribute is updated to be null is distributed to the ordinary members except the member representative in the group members corresponding to the group resource. Updating operation response messages of the ordinary members are aggregated, where the updating operation response messages only contain identification codes indicating whether the updating operation succeeds or not.

The member representative in the group members corresponding to the group resource may be identified in at least one of the following manners: an AE-ID of an AE, a CSE-ID of a CSE, a URI of an AE, or a URI of a CSE. In addition, an ID of the member representative may be contained in the group resource updating request sent by the remote CSE, in order to indicate, to the local CSE, a member representative attribute of the group resource. Of course, in some embodiments, the ID of the member representative may have been locally stored when the local CSE creates the group resource of the preset group, so that the local CSE may directly retrieve whether the group resource has the member representative attribute or not according to the locally stored member representative ID.

Figure 3:
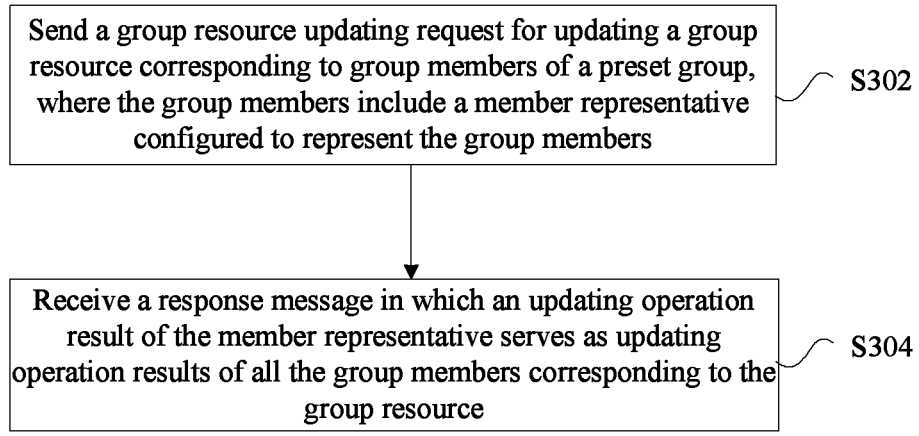
FIG. 3 is a flowchart of a second group resource updating processing method according to an embodiment of the present disclosure.

Another embodiment further provides a group resource updating processing method. FIG. 3 is a flowchart of a second group resource updating processing method according to an embodiment of the present disclosure. As shown in FIG. 3, the flow includes the following acts.

At act S302, a group resource updating request for updating a group resource corresponding to group members of a preset group is sent. The group members include a member representative configured to represent the group members.

At act S304, a response message in which an updating operation result of the member representative serves as updating operation results of all the group members corresponding to the group resource is received.

By the acts, the group resource updating request, which includes the member representative, for updating the group resource corresponding to the group members is sent, and the response message in which the updating operation result of the member representative serves as the updating operation results of all the group members corresponding to the group resource is received. The problem of network congestion caused by relatively higher signaling overhead required by a batch operation over members in a group in the related technology is solved, and effects of optimizing a group member attribute operation, effectively reducing the signaling overhead and avoiding the network congestion are further achieved.

In the embodiments, the member representative in the group members corresponding to the group resource may be identified in at least one of the following manners: an AE-ID of an AE, a CSE-ID of a CSE, a URI of an AE, or a URI of a CSE. An ID of the member representative may be contained in the group resource updating request sent by the remote CSE, in order to indicate, to the local CSE, a member representative attribute of the group resource. Of course, in some embodiments, the ID of the member representative may have been locally stored when the local CSE creates the group resource of the preset group, so that the local CSE may directly retrieve whether the group resource has the member representative attribute or not according to the locally stored member representative ID.

Another embodiment further provides a group resource updating processing device, which is arranged to implement the abovementioned embodiments and exemplary implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 4:
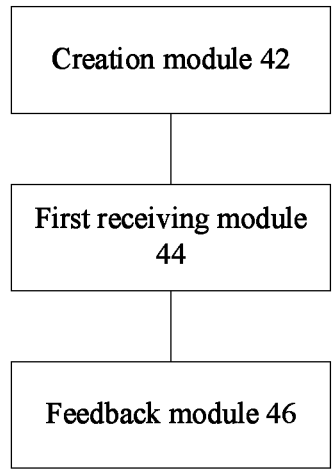
FIG. 4 is a structure block diagram of a first group resource updating processing device according to an embodiment of the present disclosure.

FIG. 4 is a structure block diagram of a first group resource updating processing device according to an embodiment of the present disclosure. As shown in FIG. 4, the device includes a creation module 42, a first receiving module 44 and a feedback module 46. The device will be described below.

The creation module 42 is arranged to create a group resource of a preset group, where group members corresponding to the group resource include a member representative configured to represent the group members. The first receiving module 44 is coupled to the creation module 42, and is arranged to receive, from a remote CSE, a group resource updating request for performing an updating operation on the group members corresponding to the group resource. The feedback module is coupled to the first receiving module 44, and is arranged to feed back, according to the group resource updating request, to the remote CSE an updating operation result of the member representative as updating operation results of all the group members corresponding to the group resource.

Figure 5:
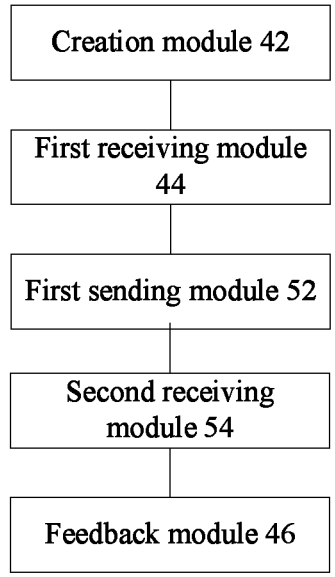
FIG. 5 is a first exemplary structure block diagram of a first group resource updating processing device according to an embodiment of the present disclosure.

FIG. 5 is a first exemplary structure block diagram of a first group resource updating processing device according to an embodiment of the present disclosure. As shown in FIG. 5, the device, besides all the modules shown in FIG. 4, further includes a first sending module 52 and a second receiving module 54. The exemplary structure will be described below.

The first sending module 52 is coupled to the first receiving module 44, and is arranged to send the group resource updating request to the member representative. The second receiving module 54 is coupled to the first sending module 52, and is arranged to receive the updating operation result, obtained according to the group resource updating request, of the member representative.

Figure 6:
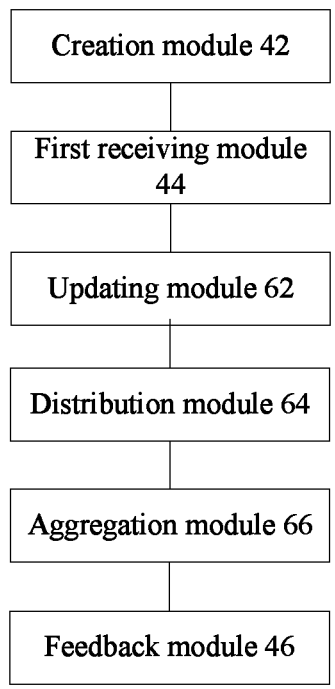
FIG. 6 is a second exemplary structure block diagram of a first group resource updating processing device according to an embodiment of the present disclosure.

FIG. 6 is a second exemplary structure block diagram of a first group resource updating processing device according to an embodiment of the present disclosure. As shown in FIG. 6, the device, besides all the modules shown in FIG. 4, further includes an updating module 62, a distribution module 64 and an aggregation module 66. The exemplary structure will be described below.

The updating module 62 is arranged to update a result content attribute in the group resource updating request to be null. The distribution module 64 is coupled to the updating module 62, and is arranged to distribute the group resource updating request in which the result content attribute is updated to be null to ordinary members except the member representative in the group members corresponding to the group resource. The aggregation module 66 is coupled to the distribution module 64 and the feedback module 46, and is arranged to aggregate updating operation response messages of the ordinary members, where the updating operation response messages may only contain identification codes indicating whether the updating operation succeeds or not.

In the embodiments, the member representative in the group members corresponding to the group resource is identified in at least one of the following manners: an AE-ID of an AE, a CSE-ID of a CSE, a URI of an AE, or a URI of a CSE.

Figure 7:
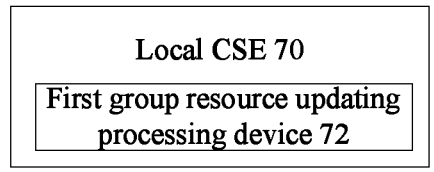
FIG. 7 is a structure block diagram of a local CSE according to an embodiment of the present disclosure.

Another embodiment further provides a local CSE. FIG. 7 is a structure block diagram of a local CSE according to an embodiment of the present disclosure. As shown in FIG. 7, the local CSE 70 includes any abovementioned first group resource updating processing device 72.

Figure 8:
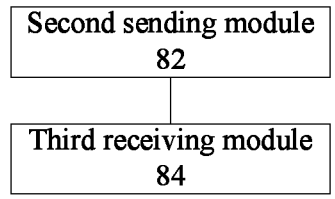
FIG. 8 is a structure block diagram of a second group resource updating processing device according to an embodiment of the present disclosure.

Another embodiment further provides a group resource updating processing device. FIG. 8 is a structure block diagram of a second group resource updating processing device according to an embodiment of the present disclosure. As shown in FIG. 8, the device includes a second sending module 82 and a third receiving module 84. The device will be described below.

The second sending module 82 is arranged to send a group resource updating request for updating a group resource corresponding to group members of a preset group, where the group members include a member representative configured to represent the group members. The third receiving module 84 is coupled to the second sending module 82, and is arranged to receive a response message in which an updating operation result of the member representative serves as updating operation results of all the group members corresponding to the group resource.

In the embodiments, the member representative in the group members corresponding to the group resource is identified in at least one of the following manners: an AE-ID of an AE, a CSE-ID of a CSE, a URI of an AE, or a URI of a CSE.

Figure 9:
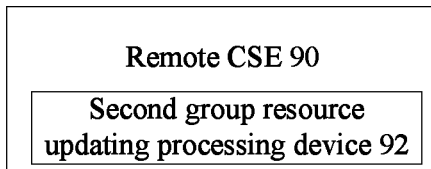
FIG. 9 is a structure block diagram of a remote CSE according to an embodiment of the present disclosure.

Another embodiment further provides a remote CSE. FIG. 9 is a structure block diagram of a remote CSE according to an embodiment of the present disclosure. As shown in FIG. 9, the remote CSE 90 includes any abovementioned second group resource updating processing device 92.

Figure 10:
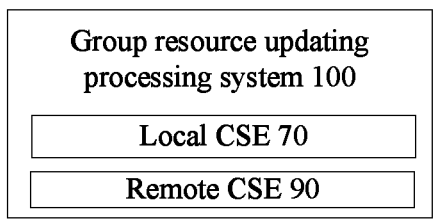
FIG. 10 is a structure block diagram of a group resource updating processing system according to an embodiment of the present disclosure.

Another embodiment further provides a group resource updating processing system. FIG. 10 is a structure block diagram of a group resource updating processing system according to an embodiment of the present disclosure. As shown in FIG. 10, the group resource updating processing system 100 includes at least one of the abovementioned local CSE 70 or the abovementioned remote CSE 90.

Equipment, applications or resources in an M2M-based group usually have some attributes and attribute values which are the same. The embodiments provide a method for managing group members, to implement group member attribute operation optimization of an M2M system, thereby reducing signaling overhead and avoiding network congestion. The method will be described below in more detail. 1. A representative entity of a preset group, e.g., an AE or a CSE sends a creation request message to a local CSE. The creation request message may include group parameters as follows:

1) a "member representative", of which a value is set to be an ID of the representative AE or CES of the group or a URI of the representative AE or CSE of the group.

The representative entity of the group may be preset by the M2M system and may also be set by an M2M user. Then, non-representative entities of the group in the embodiments are ordinary entities of the group, i.e. ordinary AEs or CSEs of the group.

2. The local CSE creates a resource "group1" of a type "group", creates a "member representative" attribute for the resource "group1", and sets an attribute value according to the group parameter.

3. A remote CSE sends a group resource updating request to the local CSE. The group resource updating request message may include a result content parameter as follows:

1) a "result content", of which a value indicates a result feedback required by an updating operation, for example, an "attribute name" which indicates a name list of attributes of resources required to be fed back.

4. The local CSE retrieves whether the resource "group1" has the "member representative" attribute or not, and if a retrieval result is positive, performs the following operations.

1) The updating request is sent to the representative AE or CSE of the group or a resource corresponding to the representative AE or CSE of the group according to the attribute value of the "member representative" attribute.

2) The attribute value of the "result content" attribute in the request message is updated to be "null", which indicates that there is no specified feedback content, and the new updating request message is distributed to the ordinary AEs or CSEs of the group or resources corresponding to the ordinary AEs or CSEs of the group.

5. The local CSE aggregates updating response messages fed back by the AEs or CSEs of the group or the resources corresponding to the AEs or CSEs of the group, and sends a group resource updating response to the remote CSE.

Exemplary implementation modes of the present disclosure will be described below.

First Exemplary Implementation Mode (URI)

1. A representative AE or CSE of a preset group sends a group resource creation request to a local CSE. The group resource creation request message may include:

1) a "member representative" attribute, of which a value is set to be a URI of the representative AE or CSE of the group; and 2) an "announce to" attribute, of which a value is set to be a CSE-ID or URI of a remote CSE.

2. The local CSE creates a resource "group1" of a type "group" and a sub-resource "distribution point" of the resource "group1", creates a "member representative" attribute for the resource "group1", and sets its value to be the attribute value of the "member representative" attribute of a group parameter in the request message.

On the other aspect, the local CSE sends a group resource creation response to the representative AE or CSE of the group, a response message including a URI of the resource "group1".

3. The local CSE sends an announcement resource creation request to the remote CSE indicated by the attribute value of the "announce to" attribute in the group resource creation request message, a request message including the "announce to" attribute of which the value is set to be the attribute value of the "announce to" attribute in the group resource creation request message.

4. After passing authorization and authentication of the local CSE, the remote CSE creates an announcement resource "group1Annc" for the group resource "group1", and sends an announcement resource creation response to the local CSE, a response message including a URI of the announcement resource "group1Annc".

5. After receiving the announcement resource creation response of the remote CSE, the local CSE creates an "announced attribute" for the resource "group1", and sets its value to be an attribute list of the group resource "group1" which has been announced to the remote CSE.

6. When a batch updating operation on one or more attributes, which are the same, of all AEs or CSEs of the group needs to be performed, the remote CSE sends a group resource updating request to the local CSE. The group resource updating request message may include:

1) a resource address, of which a value is set to be a URI of the sub-resource "distribution point" of the resource "group1", to trigger the local CSE to execute the batch updating operation over resources corresponding to all the AEs or CSEs of the group; and 2) a "result content", of which a value is set to be a result feedback required by the updating operation, for example, an "attribute name" which indicates an attribute name list of resources of which attribute values are required to be fed back.

7. After receiving the group resource updating request message sent by the remote CSE, the local CSE retrieves whether the resource "group1" has the "member representative" attribute or not, and if a retrieval result is positive, performs the following operations.

1) The updating request is sent to a resource corresponding to the representative AE or CSE of the group according to the attribute value of the "member representative" attribute, i.e. the URI of the representative AE or CSE of the group.

2) The attribute value of the "result content" attribute in the request message is updated to be "null", which indicates that there is no specified feedback content, and the new updating request message is distributed to resources corresponding to ordinary AEs or CSEs of the group in a "member list" attribute of the resource "group1".

8. The resource corresponding to the representative AE or CSE of the group executes an updating operation indicated by the request message, and feeds back an updating operation request response to the local CSE. The updating operation request response message may include:

1) a "response code" attribute, of which a value is set to be "succeed" or "failure", indicating an execution result of the updating operation; and 2) a "result content" attribute, of which a value is set to be a result feedback required by the updating operation, for example, an attribute and attribute value corresponding to "attribute name".

On the other aspect, the resources corresponding to the ordinary AEs or CSEs of the group execute the updating operation indicated by the request message, and feed back updating operation request responses to the local CSE, response messages including "response codes", indicating execution results of the updating operation.

9. The local CSE aggregates the updating operation request responses fed back by the resources corresponding to the AEs or CSEs of the group, generates a group resource updating response message by taking the value of the "result content" attribute in the response message fed back by the resource corresponding to the representative AE or CSE of the group as result feedbacks, required by the updating operation, of the resources corresponding to the ordinary AEs or CSEs of the group, and sends the group resource updating response message to the remote CSE.

Second Exemplary Implementation Mode (ID)

1. A representative AE or CSE of a preset group sends a group resource creation request to a local CSE. The group resource creation request message may include:

1) a "member representative" attribute, of which a value is set to be an ID of the representative AE or CSE of the group; and 2) an "announce to" attribute, of which a value is set to be a CSE-ID or URI of a remote CSE.

2. The local CSE creates a resource "group1" of a type "group" and a sub-resource "distribution point" of the resource "group1", creates a "member representative" attribute for the resource "group1", and sets its value to be the attribute value of the "member representative" attribute of a group parameter in the request message.

On the other aspect, the local CSE sends a group resource creation response to the representative AE or CSE of the group, a response message including a URI of the resource "group1".

3. The local CSE sends an announcement resource creation request to the remote CSE indicated by the attribute value of the "announce to" attribute in the group resource creation request message, a request message including the "announce to" attribute of which the value is set to be the attribute value of the "announce to" attribute in the group resource creation request message.

4. After passing authorization and authentication of the local CSE, the remote CSE creates an announcement resource "group1Annc" for the group resource "group1", and sends an announcement resource creation response to the local CSE, a response message including a URI of the announcement resource "group1Annc".

5. After receiving the announcement resource creation response of the remote CSE, the local CSE creates an "announced attribute" for the resource "group1", and sets its value to be an attribute list of the group resource "group1" which has been announced to the remote CSE.

6. When a batch updating operation on one or more attributes, which are the same, of all AEs or CSEs of the group needs to be performed, the remote CSE sends a group resource updating request to the local CSE. The group resource updating request message may include:

1) a resource address, of which a value is set to be a URI of the sub-resource "distribution point" of the resource "group1", to trigger the local CSE to execute the batch updating operation over all the AEs or CSEs of the group; and 2) a "result content", of which a value is set to be a result feedback required by the updating operation, for example, an "attribute name" which indicates an attribute name list of resources of which attribute values are required to be fed back.

7. After receiving the group resource updating request message sent by the remote CSE, the local CSE retrieves whether the resource "group1" has the "member representative" attribute or not, and if a retrieval result is positive, performs the following operations.

1) The updating request is sent to the representative AE or CSE of the group according to the attribute value of the "member representative" attribute, i.e. the AE-ID of the representative AE or CSE-ID of the representative CSE of the group.

2) The attribute value of the "result content" attribute in the request message is updated to be "null", which indicates that there is no specified feedback content, and the new updating request message is distributed to ordinary AEs or CSEs of the group in a "member list" attribute of the resource "group1".

8. The representative AE or CSE of the group executes an updating operation indicated by the request message, and feeds back an updating operation request response to the local CSE. The updating operation request response message may include:

1) a "response code" attribute, of which a value is set to be "succeed" or "failure", indicating an execution result of the updating operation; and 2) a "result content" attribute, of which a value is set to be a result feedback required by the updating operation, for example, an attribute and attribute value corresponding to "attribute name".

On the other aspect, the ordinary AEs or CSEs of the group execute the updating operation indicated by the request message, and feed back updating operation request responses to the local CSE, response messages including "response codes", indicating execution results of the updating operation.

9. The local CSE aggregates the updating operation request responses fed back by the AEs or CSEs of the group, generates a group resource updating response message by taking the value of the "result content" attribute in the response message fed back by the representative AE or CSE of the group as result feedbacks, required by the updating operation, of the ordinary AEs or CSEs of the group, and sends the group resource updating response message to the remote CSE.

Obviously, those skilled in the art should know that each module or each act of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

As mentioned above, by the embodiments and exemplary implementation modes, the problem of network congestion caused by relatively higher signaling overhead required by a batch operation over members in a group in the related technology is solved, and effects of optimizing a group member attribute operation, effectively reducing the signaling overhead and avoiding the network congestion are further achieved.

What is claimed is:

1. A group resource updating processing method, comprising:
    creating a group resource of a preset group, wherein group members corresponding to the group resource comprise a member representative configured to represent the group members;
    receiving, from a remote Common Services Entity (CSE), a group resource updating request for performing an updating operation on the group members corresponding to the group resource; and
    feeding back, according to the group resource updating request, to the remote CSE an updating operation result of the member representative as updating operation results of all the group members corresponding to the group resource;
    before feeding back, according to the group resource updating request, to the remote CSE the updating operation result of the member representative as the updating operation results of all the group members corresponding to the group resource, further comprising:
  updating a result content attribute in the group resource updating request to be null;
  distributing the group resource updating request in which the result content attribute is updated to be null to ordinary members except the member representative in the group members corresponding to the group resource; and
  aggregating updating operation response messages of the ordinary members, wherein the updating operation response messages only contain identification codes indicating whether the updating operation succeeds or not.

2. The method as claimed in claim 1, before feeding back, according to the group resource updating request, to the remote CSE the updating operation result of the member representative as the updating operation results of all the group members corresponding to the group resource, further comprising:
  sending the group resource updating request to the member representative; and
  receiving the updating operation result, obtained according to the group resource updating request, of the member representative.

3. The method as claimed in claim 1, wherein the member representative in the group members corresponding to the group resource is identified in at least one of the following manners: an Application Entity (AE) Identifier (AE-ID) of an AE, a CSE-ID of a CSE, a Uniform Resource Identifier (URI) of an AE, or a URI of a CSE.

4. A group resource updating processing device, comprising a hardware processor arranged to execute program modules comprising:
  a creation module, arranged to create a group resource of a preset group, wherein group members corresponding to the group resource comprise a member representative configured to represent the group members;
  a first receiving module, arranged to receive, from a remote Common Services Entity (CSE), a group resource updating request for performing an updating operation on the group members corresponding to the group resource; and
  a feedback module, arranged to feed back, according to the group resource updating request, to the remote CSE an updating operation result of the member representative as updating operation results of all the group members corresponding to the group resource;
  an updating module, arranged to update a result content attribute in the group resource updating request to be null;
  a distribution module, arranged to distribute the group resource updating request in which the result content attribute is updated to be null to ordinary members except the member representative in the group members corresponding to the group resource; and
  an aggregation module, arranged to aggregate updating operation response messages of the ordinary members, wherein the updating operation response messages only contain identification codes indicating whether the updating operation succeeds or not.

5. The device as claimed in claim 4, wherein the hardware processor is arranged to execute program modules comprising:
  a first sending module, arranged to send the group resource updating request to the member representative; and
  a second receiving module, arranged to receive the updating operation result, obtained according to the group resource updating request, of the member representative.

6. The device as claimed in claim 4, wherein the member representative in the group members corresponding to the group resource is identified in at least one of the following manners: an Application Entity (AE) Identifier (AE-ID) of an AE, a CSE-ID of a CSE, a Uniform Resource Identifier (URI) of an AE, or a URI of a CSE.

7. A local Common Services Entity (CSE), comprising the device as claimed in claim 4.

8. The device as claimed in claim 4, wherein the hardware processor is arranged to execute program modules comprising:
  a second sending module, arranged to send a group resource updating request for updating a group resource corresponding to group members of a preset group, wherein the group members comprise a member representative configured to represent the group members; and
  a third receiving module, arranged to receive a response message in which an updating operation result of the member representative serves as updating operation results of all the group members corresponding to the group resource.

9. The device as claimed in claim 8, wherein the member representative in the group members corresponding to the group resource is identified in at least one of the following manners: an Application Entity (AE) Identifier (AE-ID) of an AE, a Common Services Entity (CSE) ID (CSE-ID) of a CSE, a Uniform Resource Identifier (URI) of an AE, or a URI of a CSE.

10. A remote Common Services Entity (CSE), comprising the device as claimed in claim 8.

11. The method as claimed in claim 2, wherein the member representative in the group members corresponding to the group resource is identified in at least one of the following manners: an Application Entity (AE) Identifier (AE-ID) of an AE, a CSE-ID of a CSE, a Uniform Resource Identifier (URI) of an AE, or a URI of a CSE.

12. The device as claimed in claim 5, wherein the member representative in the group members corresponding to the group resource is identified in at least one of the following manners: an Application Entity (AE) Identifier (AE-ID) of an AE, a CSE-ID of a CSE, a Uniform Resource Identifier (URI) of an AE, or a URI of a CSE.

* * * * *